US011265918B2

(12) United States Patent
Islam et al.

(10) Patent No.: US 11,265,918 B2
(45) Date of Patent: Mar. 1, 2022

(54) TIMING ADVANCE SIGNALING IN A PHYSICAL DOWNLINK CONTROL CHANNEL

(71) Applicant: QUALCOMM Incorporated, San Diego, CA (US)

(72) Inventors: Muhammad Nazmul Islam, Littleton, MA (US); Navid Abedini, Somerset, NJ (US); Samel Celebi, West New York, NJ (US); Tao Luo, San Diego, CA (US); Jianghong Luo, Skillman, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/592,308

(22) Filed: Oct. 3, 2019

(65) Prior Publication Data

US 2020/0112995 A1    Apr. 9, 2020

Related U.S. Application Data

(60) Provisional application No. 62/742,792, filed on Oct. 8, 2018.

(51) Int. Cl.
*H04W 72/12* (2009.01)
*H04W 74/08* (2009.01)
(Continued)

(52) U.S. Cl.
CPC ...... *H04W 74/0833* (2013.01); *H04B 7/0695* (2013.01); *H04W 56/0045* (2013.01);
(Continued)

(58) Field of Classification Search
None
See application file for complete search history.

(56) References Cited

U.S. PATENT DOCUMENTS

2012/0300715 A1\* 11/2012 Pelletier ............ H04W 74/0891
370/329
2014/0226601 A1\* 8/2014 Park ................. H04W 74/0833
370/329

(Continued)

FOREIGN PATENT DOCUMENTS

WO    WO-2018084773 A1    5/2018

OTHER PUBLICATIONS

"3rd Generation Partnership Project; Technical Specification Group Radio Access Network; NR; Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.3.0, Sep. 25, 2018 (Sep. 25, 2018), pp. 1-76, XP051487371, [retrieved on Sep. 25, 2018] sections 5.18.3, 5.18.8, 6.1.3.14, 6 .1.3.18.

(Continued)

*Primary Examiner* — Brandon M Renner
(74) *Attorney, Agent, or Firm* — Qualcomm Incorporated

(57) ABSTRACT

Methods, systems, and devices for wireless communication are described. Generally, the described techniques provide for transmitting a first random-access channel (RACH) message and receiving a second RACH message that includes a timing advance command (TAC) in a physical downlink control channel (PDCCH). These techniques may be used by a user equipment (UE) or an integrated access backhaul (IAB) node to achieve time synchronization while limiting overhead. In one example, in an IAB network, an IAB node may transmit a first RACH message to a neighbor (Continued)

node, and the IAB node may receive a TAC in a PDCCH of a second RACH message from the neighbor node. In another example, in a beam failure recovery (BFR) procedure, a UE may transmit a first RACH message to a base station, and the UE may receive a TAC in a PDCCH of a second RACH message from the base station.

30 Claims, 14 Drawing Sheets

(51) Int. Cl.
  *H04W 56/00* (2009.01)
  *H04W 74/02* (2009.01)
  *H04B 7/06* (2006.01)
  *H04W 76/11* (2018.01)
  *H04W 72/04* (2009.01)
(52) U.S. Cl.
  CPC ......... *H04W 72/042* (2013.01); *H04W 74/02* (2013.01); *H04W 76/11* (2018.02)

(56) References Cited

U.S. PATENT DOCUMENTS

| | | | |
|---|---|---|---|
| 2018/0192443 A1* | 7/2018 | Novlan | H04W 76/11 |
| 2019/0132882 A1* | 5/2019 | Li | H04W 74/0833 |
| 2019/0150125 A1* | 5/2019 | Bagheri | H04L 69/324 |
| | | | 370/336 |
| 2019/0349871 A1* | 11/2019 | Ghosh | H04W 56/001 |
| 2020/0107369 A1* | 4/2020 | Jeon | H04W 74/0833 |
| 2020/0112953 A1* | 4/2020 | Bendlin | H04L 5/005 |
| 2020/0367079 A1* | 11/2020 | Chen | H04W 24/08 |
| 2020/0404617 A1* | 12/2020 | Murray | H04W 52/0229 |

OTHER PUBLICATIONS

"3rd Generation Partnership Project; Technical Specification Group Radio Access Network; NR; NR and NG-RAN Overall Description; Stage 2 (Release 15)", 3GPP Standard; Technical Specification; 3GPP TS 38.300, 3rd Generation Partnership Project (3GPP), Mobile Competence Centre, 650, Route Des Lucioles, F-06921 Sophia-Antipolis Cedex, France, vol. RAN WG2, No. V15.3.1, Oct. 7, 2018, pp. 1-92, XP051487627, [retrieved on Oct. 7, 2018], TS-38.300, p. 23, section 5.3.5.3, TS-38.300, p. 56, section 9.2.6, TS-38.300, p. 23, section 5.3.4, TS-38.300, p. 57; figures 9.2.6-1 (a)-(b).
International Search Report and Written Opinion—PCT/US2019/054699—ISA/EPO—dated Jan. 3, 2020 (185161WO).

* cited by examiner

TIMING ADVANCE SIGNALING IN A PHYSICAL DOWNLINK CONTROL CHANNEL

CROSS REFERENCE

The present application for patent claims the benefit of U.S. Provisional Patent Application No. 62/742,792 by ISLAM et al., entitled "TIMING ADVANCE SIGNALING IN A PHYSICAL DOWNLINK CONTROL CHANNEL," filed Oct. 8, 2018, assigned to the assignee hereof, and expressly incorporated by reference herein.

BACKGROUND

The following relates generally to wireless communications and more specifically to timing advance signaling in a physical downlink control channel (PDCCH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may use a random-access procedure to synchronize timing for communicating with one or more base stations. Conventional techniques at a UE for synchronizing timing for communicating with one or more base stations may be deficient.

SUMMARY

The described techniques relate to improved methods, systems, devices, and apparatuses that support timing advance signaling in a physical downlink control channel (PDCCH). Generally, the described techniques provide for transmitting a first random-access channel (RACH) message and receiving a second RACH message that includes a timing advance command (TAC) in a PDCCH. These techniques may be used by a user equipment (UE) or an integrated access backhaul (IAB) node to achieve time synchronization while limiting overhead. In one example, in an IAB network, an IAB node may transmit a first RACH message to a non-parent neighbor node, and the IAB node may receive a TAC in a PDCCH (e.g., rather than a PDSCH) of a second RACH message from the neighbor node. In another example, in a network supporting beam failure recovery (BFR), a UE may transmit a first RACH message to a base station (e.g., to select a new beam), and the UE may receive a TAC in a PDCCH of a second RACH message from the base station.

A method for wireless communication is described. The method may include transmitting a first random-access channel message, receiving a second random-access channel message in response to the first random-access channel message, the second random-access channel message including a timing advance command in a physical downlink control channel, identifying the timing advance command in the physical downlink control channel of the second random-access channel message based on the first random-access channel message, and communicating based on identifying the timing advance command.

An apparatus for wireless communication is described. The apparatus may include a processor, memory in electronic communication with the processor, and instructions stored in the memory. The instructions may be executable by the processor to cause the apparatus to transmit a first random-access channel message, receive a second random-access channel message in response to the first random-access channel message, the second random-access channel message including a timing advance command in a physical downlink control channel, identify the timing advance command in the physical downlink control channel of the second random-access channel message based on the first random-access channel message, and communicate based on identifying the timing advance command.

Another apparatus for wireless communication is described. The apparatus may include means for transmitting a first random-access channel message, receiving a second random-access channel message in response to the first random-access channel message, the second random-access channel message including a timing advance command in a physical downlink control channel, identifying the timing advance command in the physical downlink control channel of the second random-access channel message based on the first random-access channel message, and communicating based on identifying the timing advance command.

A non-transitory computer-readable medium storing code for wireless communication is described. The code may include instructions executable by a processor to transmit a first random-access channel message, receive a second random-access channel message in response to the first random-access channel message, the second random-access channel message including a timing advance command in a physical downlink control channel, identify the timing advance command in the physical downlink control channel of the second random-access channel message based on the first random-access channel message, and communicate based on identifying the timing advance command.

In some examples of the method, apparatuses, and non-transitory computer-readable medium described herein, transmitting the first random-access channel message and receiving the second random-access channel message may include operations, features, means, or instructions for transmitting, to a neighbor node, the first random-access channel message as a request for the timing advance command and receiving, from the neighbor node, the second random-access channel message including the timing advance command in the physical downlink control channel based on the first random-access channel message being transmitted as the request for the timing advance command.

Some examples of the method, apparatuses, and non-transitory computer-readable medium described herein may further include operations, features, means, or instructions for receiving an indication of dedicated random-access channel resources allocated for transmitting the first random-access channel message to the neighbor node and transmitting the first random-access channel message to the neighbor node on the dedicated random-access channel resources. In some examples of the method, apparatuses, and non-transitory computer-readable medium described herein, the second random-access channel message may be scrambled using a random-access radio network temporary identifier (RA-RNTI). In some examples of the method, apparatuses, and non-transitory computer-readable medium described herein, the second random-access channel message may be scrambled using a cell radio network temporary identifier (C-RNTI) specific to a wireless node. In some examples of the method, apparatuses, and non-transitory computer-readable medium described herein, the communicating may be within an integrated access backhaul (IAB) network.

In some examples of the method, apparatuses, and non-transitory computer-readable medium described herein, transmitting the first random-access channel message and receiving the second random-access channel message may include operations, features, means, or instructions for transmitting the first random-access channel message to a node as part of a BFR procedure and receiving, from the node, the second random-access channel message including the timing advance command in the physical downlink control channel based on the first random-access channel message being transmitted as part of a BFR procedure.

In some examples of the method, apparatuses, and non-transitory computer-readable medium described herein, communicating based on identifying the timing advance command may include operations, features, means, or instructions for identifying time synchronization using the timing advance command and communicating based on the time synchronization. In some examples of the method, apparatuses, and non-transitory computer-readable medium described herein, the first random-access channel message may be transmitted as part of a contention-free random-access (CFRA) procedure or a contention-based random-access (CBRA) procedure. In some examples of the method, apparatuses, and non-transitory computer-readable medium described herein, the timing advance command includes an absolute timing advance command or a relative timing advance command.

A method for wireless communication is described. The method may include receiving a first random-access channel message, identifying a timing advance command to transmit based on receiving the first random-access channel message, and transmitting the timing advance command in a physical downlink control channel of a second random-access channel message based on the first random-access channel message.

An apparatus for wireless communication is described. The apparatus may include a processor, memory in electronic communication with the processor, and instructions stored in the memory. The instructions may be executable by the processor to cause the apparatus to receive a first random-access channel message, identify a timing advance command to transmit based on receiving the first random-access channel message, and transmit the timing advance command in a physical downlink control channel of a second random-access channel message based on the first random-access channel message.

Another apparatus for wireless communication is described. The apparatus may include means for receiving a first random-access channel message, identifying a timing advance command to transmit based on receiving the first random-access channel message, and transmitting the timing advance command in a physical downlink control channel of a second random-access channel message based on the first random-access channel message.

A non-transitory computer-readable medium storing code for wireless communication is described. The code may include instructions executable by a processor to receive a first random-access channel message, identify a timing advance command to transmit based on receiving the first random-access channel message, and transmit the timing advance command in a physical downlink control channel of a second random-access channel message based on the first random-access channel message.

Some examples of the method, apparatuses, and non-transitory computer-readable medium described herein may further include operations, features, means, or instructions for determining that the first random-access channel message may be transmitted as a request for the timing advance command and transmitting the timing advance command in the physical downlink control channel of the second random-access channel message based on the first random-access channel message being transmitted as the request for the timing advance command. Some examples of the method, apparatuses, and non-transitory computer-readable medium described herein may further include operations, features, means, or instructions for transmitting an indication of dedicated random-access channel resources allocated for transmitting the first random-access channel message and receiving the first random-access channel message on the dedicated random-access channel resources.

In some examples of the method, apparatuses, and non-transitory computer-readable medium described herein, the second random-access channel message may be scrambled using an RA-RNTI. In some examples of the method, apparatuses, and non-transitory computer-readable medium described herein, the second random-access channel message may be scrambled using a C-RNTI specific to a UE. Some examples of the method, apparatuses, and non-transitory computer-readable medium described herein may further include operations, features, means, or instructions for receiving the first random-access channel message from a UE as part of a BFR procedure and transmitting, to the UE, the timing advance command in the physical downlink control channel of the second random-access channel message based on the first random-access channel message being received as part of a BFR procedure. In some examples of the method, apparatuses, and non-transitory computer-readable medium described herein, the first random-access channel message may be received as part of a contention-free random-access (CFRA) procedure or a contention-based random-access (CBRA) procedure. In some examples of the method, apparatuses, and non-transitory computer-readable medium described herein, the timing advance command includes an absolute timing advance command or a relative timing advance command.

DETAILED DESCRIPTION

Figure 1:
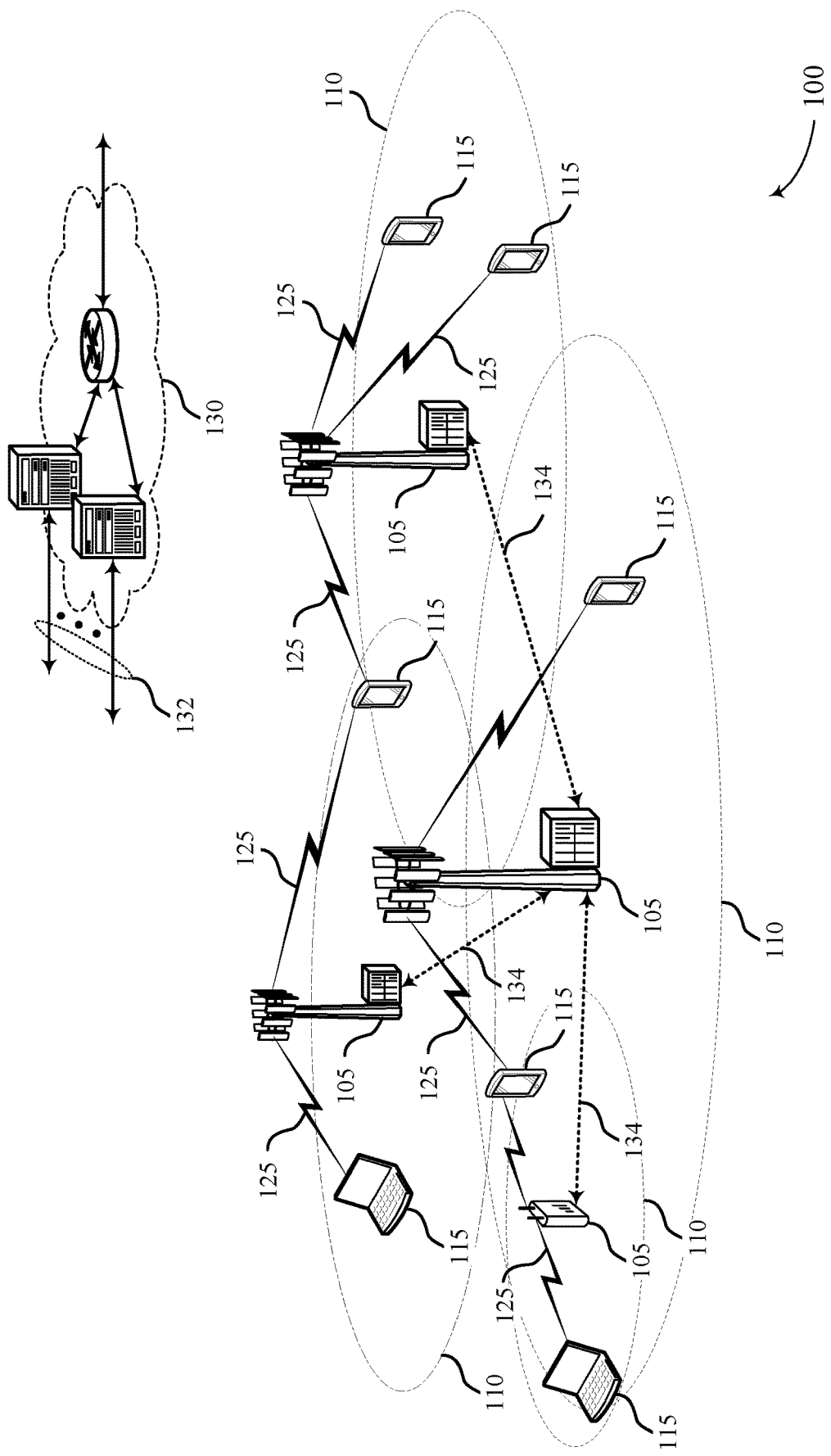
FIGS. 1-3 illustrate examples of wireless communications systems in accordance with aspects of the present disclosure.

In some wireless communications systems, a wireless device may use a random-access procedure to synchronize timing for communicating in a network. For instance, in an integrated access backhaul (IAB) network, an IAB node may use a random-access procedure to synchronize timing for communicating in the IAB network (e.g., without establishing a new connection with a base station or another IAB node). Similarly, in networks supporting beam failure recovery (BFR), a UE may use a random-access procedure to synchronize timing for communicating with the base station and to identify a new beam for communicating with a base station. In such systems, the wireless device may transmit a first random-access channel (RACH) message to a base station or a non-parent neighbor node, and the wireless device may receive a second RACH message that includes a timing advance command (TAC) for time synchronization.

For example, the wireless device may receive a second RACH message including a physical downlink control channel (PDCCH) and a physical downlink shared channel (PDSCH), where the PDCCH may provide scheduling information for the PDSCH, and the PDSCH may include the TAC, an uplink grant (e.g., for an uplink transmission scheduled after the second RACH message is received), a temporary cell radio network temporary identifier (TC-RNTI), etc. In some cases, however, the wireless device may not use any of the information received in the PDSCH other than the TAC. Further, in some examples, the wireless device may not even receive the PDSCH (e.g., in a BFR procedure, where a UE 115 determines that the BFR procedure is successful after receiving the PDCCH). Thus, the allocation of resources for the PDSCH may be wasteful.

As described herein, a wireless communications system may support efficient techniques for signaling a TAC to allow a UE or an IAB node to achieve time synchronization while limiting overhead. In one example, in an IAB network, an IAB node may transmit a first RACH message to a neighbor node, and the IAB node may receive a TAC in a PDCCH (e.g., rather than a PDSCH) of a second RACH message from the neighbor node. In another example, in a network supporting beam failure recovery (BFR), a UE may transmit a first RACH message to a base station (e.g., to identify a new beam), and the UE may receive a TAC in a PDCCH of a second RACH message from the base station (e.g., since the UE may not receive the PDSCH of the second RACH message if the UE determines that the BFR procedure is successful based on receiving the PDCCH of the second RACH message). Accordingly, the UE may avoid waiting on or monitoring for the PDSCH in the second RACH message resulting in reduced latency and overhead.

Aspects of the disclosure introduced above are described below in the context of a wireless communications system. Examples of processes and signaling exchanges that support timing advance signaling in a PDCCH are then described. Aspects of the disclosure are further illustrated by and described with reference to apparatus diagrams, system diagrams, and flowcharts that relate to timing advance signaling in a PDCCH.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a PDCCH or a PDSCH). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100, a UE 115 may use a random-access procedure to gain access to a base station 105 and synchronize timing for communicating with the base station 105. As part of the random-access procedure, the UE 115 may transmit a first RACH message (e.g., RACH Msg1) with a particular preamble sequence to the base station 105. For a contention-free random-access (CFRA) procedure (e.g., for a handover), the network may reserve a preamble sequence for the UE 115, and the UE 115 may transmit the first RACH message using the reserved preamble sequence. Alternatively, for a contention-based random-access (CBRA) procedure (e.g., for an RRC connection establishment procedure), the UE 115 may transmit the first RACH message using a random preamble sequence (e.g., selected from an available set of preamble sequences).

After transmitting the first RACH message, the UE 115 may receive a second RACH message (e.g., RACH Msg2) from the base station 105. The second RACH message may include a PDCCH and a PDSCH, where the PDCCH may provide scheduling information for the PDSCH, and the PDSCH may include a TAC, an uplink grant (e.g., for an uplink transmission scheduled after the second RACH message is received), a temporary cell radio network temporary identifier (TC-RNTI), etc. The UE 115 may then use the TAC to synchronize timing with the base station 105 (e.g., the UE 115 may adjust a timing advance used for communicating with the base station 105 based on the TAC). Subsequently, for a CBRA procedure, the UE 115 may continue to communicate with the base station 105 for the remainder of the RACH procedure to establish an RRC connection with the base station 105. Alternatively, for a CFRA procedure, the UE 115 may transmit a message to the base station 105 indicating that an RRC connection reconfiguration is complete (e.g., for a handover).

In some aspects, in wireless communications system 100, it may be appropriate for a wireless device to use a random-access procedure to synchronize timing for communicating in the wireless system 100. For instance, in an IAB network, an IAB node may use a random-access procedure to synchronize timing for communicating in the IAB network (e.g., without establishing a new connection with a base station 105 or another IAB node). Similarly, in a network supporting BFR, a UE 115 (or an IAB node) may use a random-access procedure to identify a new beam for communicating with a base station 105 (or a parent IAB node) and to synchronize timing for communicating with the base station 105 (or the parent IAB node). Thus, as part of the random-access procedure, the wireless device may transmit a first RACH message to a base station 105 or an IAB node, and the wireless device may receive a second RACH message that includes a TAC.

In some examples, the second RACH message may include a PDCCH and a PDSCH, where the PDCCH may provide scheduling information for the PDSCH, and the PDSCH may include the TAC, an uplink grant (e.g., for an uplink transmission scheduled after the second RACH message is received), a temporary cell radio network temporary identifier (TC-RNTI), etc. In some cases, however, the wireless device may not use any of the information received in the PDSCH other than the TAC (e.g., since the random-access procedure is being used for synchronization). Further, in some examples, the wireless device may not even receive the PDSCH (e.g., in a BFR procedure, where a UE 115 determines that the BFR procedure is successful after receiving the PDCCH). Thus, the allocation of resources for the PDSCH may be wasteful, and, in the case of a BFR procedure, a UE 115 may not even receive the PDSCH that includes the TAC. Wireless communications system 100 may support efficient techniques for signaling a TAC to allow a UE 115 or an IAB node to achieve time synchronization while limiting overhead.

Figure 2:
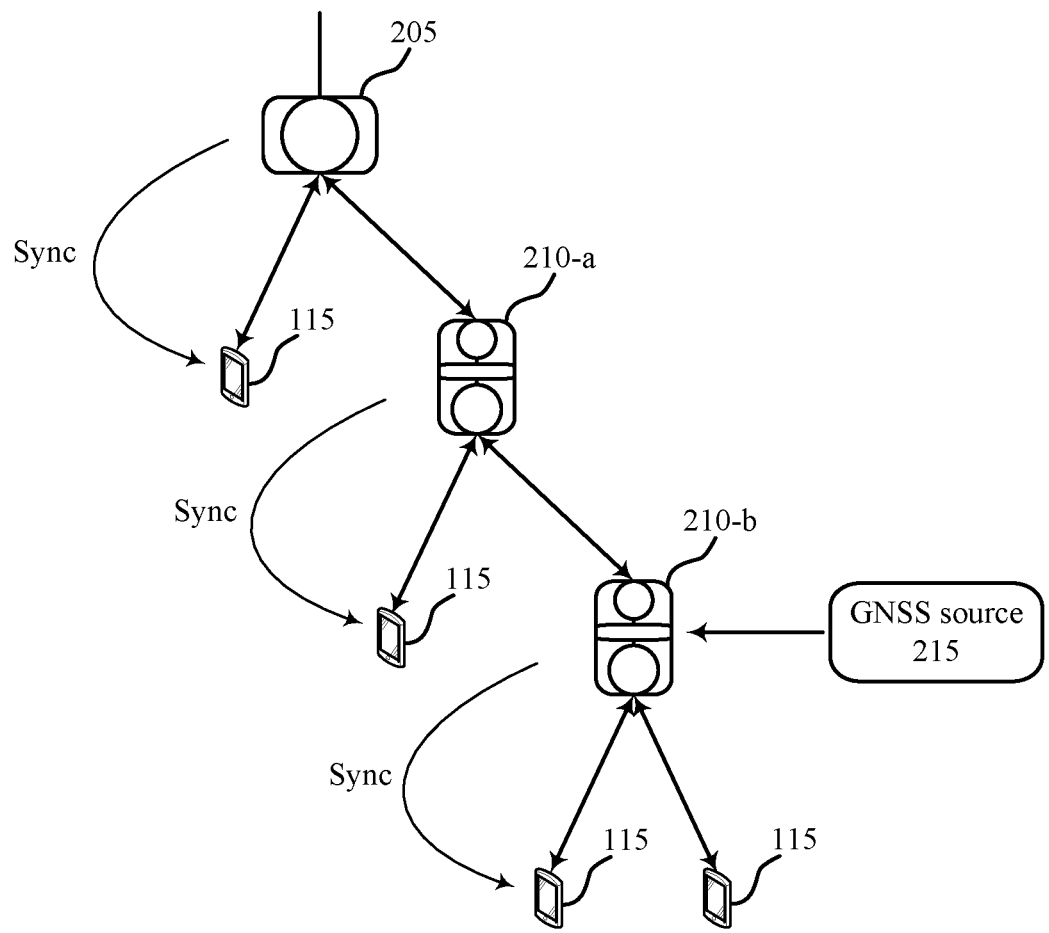

FIG. 2 illustrates an example of a wireless communications system 200 in accordance with aspects of the present disclosure. Wireless communications system 200 may be an example of an IAB network and may include IAB donor 205 (e.g., a base station 105) and IAB nodes 210 (e.g., relay stations). Each IAB node 210 may be connected to a parent node (e.g., an IAB donor or an IAB node) and may receive over-the-air (OTA) time synchronization from the parent node. For example, the time synchronization information may be passed down through an IAB network from the IAB donor 205 or another IAB node (e.g., which may be a global navigation satellite system (GNSS) source or may be connected to a global positioning system (GPS)). In a multi-hop IAB network, however, where an IAB node 210 may be multiple hops away from an IAB donor (e.g., the IAB node may be separated from the IAB donor by other connected IAB nodes), the time synchronization information passed down to the IAB node 210 may be incorrect (e.g., due to the accumulated errors over multiple hops).

Thus, only a limited number of hops may be supported for OTA time synchronization (e.g., 5-7 hops in a mmW multi-hop IAB network and 1-2 hops in a sub-6 multi-hop IAB network). In some cases, however, an IAB node 210-*b* in a multi-hop network may be connected such that the limited number of hops supported for OTA time synchronization may be exceeded (e.g., the IAB node 210-*b* may be a threshold number of hops away from the IAB donor). In such cases, the IAB node 210-*b* may use a random-access procedure to achieve time synchronization. For instance, the IAB node 210-b may transmit a first RACH message to a neighbor node (e.g., a non-parent IAB node 210 or a base station 105 that is connected to a GNSS source 215 or that is fewer hops away from a GNSS source 215), and the IAB node 210-b may receive a second RACH message including a TAC which the IAB node 210-b may use for time synchronization.

As described with reference to FIG. 1, the second RACH message may include a PDCCH and a PDSCH, where the PDCCH may provide scheduling information for the PDSCH, and the PDSCH may include the TAC, an uplink grant (e.g., for an uplink transmission scheduled after the second RACH message is received), a temporary cell radio network temporary identifier (TC-RNTI), etc. In some cases, however, the IAB node may not use any of the information received in the PDSCH other than the TAC. For example, since the random-access procedure is being used for time synchronization (e.g., and is not being used to establish a new connection with an JAB node or a base station 105), the JAB node may not use any information in the PDSCH of the second RACH message other than the TAC (e.g., the uplink grant may not be used). Thus, the allocation of resources for the PDSCH may be wasteful. As described herein, wireless communications system 200 may support efficient techniques for signaling a TAC to an JAB node to allow the JAB node to achieve time synchronization while limiting overhead.

In particular, a neighbor node that receives a first RACH message may determine that the first RACH message was transmitted as a request for a TAC (e.g., not for establishing a connection), and the neighbor node may transmit a second RACH message that includes a TAC in the PDCCH of the second RACH message in response to the first RACH message (e.g., without including a PDSCH in the second RACH message or without including data in the PDSCH in the second RACH message). In some cases, the second RACH message may be scrambled using a cell radio network temporary identifier (C-RNTI) specific to a UE 115 or an IAB node 210 (e.g., such that the UE 115 or an IAB node 210 may be able to identify the second RACH message), or the second RACH message may be scrambled using a random-access radio network temporary identifier (RA-RNTI) (e.g., if the second RACH message is transmitted on dedicated resources, as described in further detail below). Since the TAC may be included in the PDCCH (e.g., rather than the PDSCH), the network may avoid allocating resources for the PDSCH (i.e., the network may save PDSCH resources for the second RACH message).

In some cases, the network may reserve one or more preambles for IAB nodes 210 to use to transmit a first RACH message as a request for a TAC. In such cases, when a neighbor node receives a first RACH message with one of the reserved preambles, the neighbor node may determine that the first RACH message is transmitted as a request for a TAC, and the neighbor node may transmit the TAC in the PDCCH of a second RACH message in response to the first RACH message. Additionally, or alternatively, the network may reserve dedicated resources (e.g., a dedicated physical RACH (PRACH) region) for transmitting the first RACH message. In such cases, when a neighbor node receives a first RACH message on the dedicated resources (e.g., as part of a CBRA procedure or a CFRA procedure), the neighbor node may determine that the first RACH message is transmitted as a request for a TAC, and the neighbor node may transmit the TAC in the PDCCH of a second RACH message in response to the first RACH message.

Figure 3:
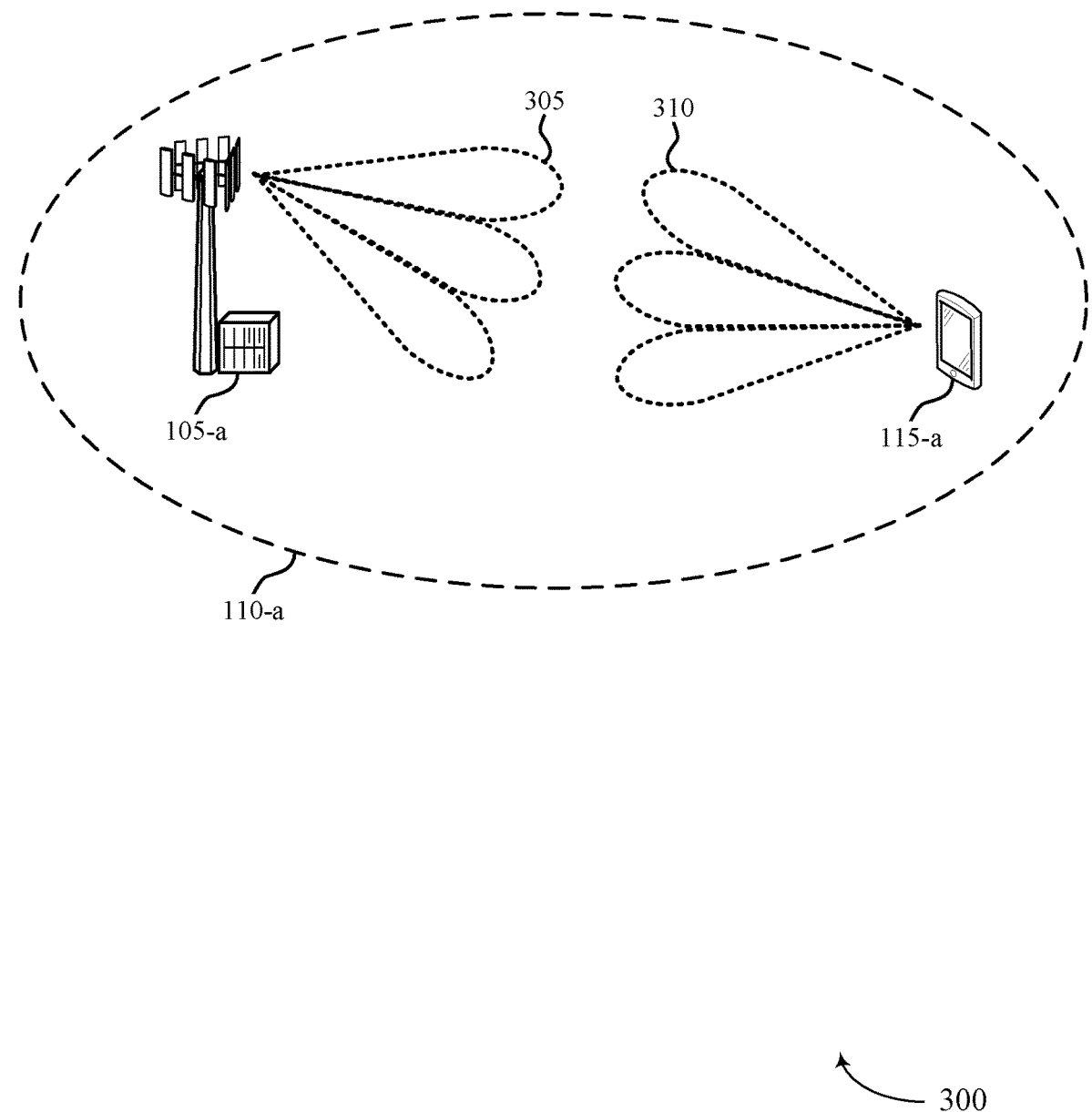

FIG. 3 illustrates an example of a wireless communications system 300 in accordance with aspects of the present disclosure. Wireless communications system 300 includes base station 105-a, which may be an example of a base station 105 described with reference with FIG. 1. Wireless communications system 300 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 300 may implement aspects of wireless communications system 100. For example, wireless communications system 300 may support communication between base station 105-a and UE 115-a using beamforming, where base station 105-a may transmit signals to or receive signals from UE 115-a on one or more beams 305 and UE 115-a may receive signals from or transmit signals to base station 105-a on one or more beams 310.

In some cases, a beam used for communicating between base station 105-a and UE 115-a may fail (e.g., due to changing channel conditions). In such cases, the UE 115-a may initiate a BFR procedure to identify a new beam for communicating with the base station 105-a. In particular, the UE 115-a may monitor for synchronization signals from a base station 105-a, and, once the UE 115-a receives synchronization signals on a beam having good quality (e.g., above a threshold quality), the UE 115-a may transmit a first RACH message (e.g., with a timing advance of zero) to indicate that the beam used to transmit the synchronization signals is preferred for future communications. The UE 115-a may then receive a second RACH message from the base station 105-a scrambled using a C-RNTI specific to the UE 115-a, and UE 115-a may determine that the BFR procedure was successful. However, since the PDCCH of the second RACH message may be transmitted in advance of the PDSCH, UE 115-a may receive the PDCCH and may determine that the BFR procedure was successful. As such, UE 115-a may fail to receive the PDSCH (e.g., that includes the TAC for timing synchronization) and UE 115-a may not be able to re-synchronize timing for communicating with base station 105-a on the new beam. For example, UE 115-a may fall back to a previous timing advance, which may not be suitable for communicating using the new beam.

As described herein, wireless communications system 300 may support efficient techniques for signaling a TAC to a UE 115-a to allow the UE 115-a to achieve time synchronization for communicating using a new beam while limiting overhead. In particular, a base station 105-a that receives a first RACH message may determine that the first RACH message was transmitted as part of a BFR procedure, and the base station 105-a may transmit a second RACH message that includes a TAC in the PDCCH in response to the first RACH message (e.g., without including a PDSCH in the second RACH message). In some cases, the second RACH message may be scrambled using a C-RNTI specific to a UE 115 or specific to an IAB node 210 (e.g., such that the UE 115 or IAB node 210 may be able to identify the second RACH message), or the second RACH message may be scrambled using a random-access radio network temporary identifier (RA-RNTI) (e.g., if the second RACH message is transmitted on dedicated resources, as described in further detail below). Since the TAC may be included in the PDCCH (e.g., rather than the PDSCH), the UE 115-a may be able to receive the TAC and perform time synchronization.

In some cases, the network may reserve one or more preambles for UEs 115 to use to transmit a first RACH message for a BFR procedure. In such cases, when a base station 105-*a* receives a first RACH message with one of the reserved preambles, the base station 105-*a* may determine that the first RACH message is transmitted as part of a BFR procedure, and the base station 105-*a* may transmit the TAC in the PDCCH of a second RACH message in response to the first RACH message. Additionally, or alternatively, the network may reserve dedicated resources (e.g., a dedicated PRACH region) for transmitting a first RACH message for a BFR procedure. In such cases, when a base station 105-*a* receives a first RACH message on the dedicated resources (e.g., as part of a CBRA procedure or a CFRA procedure), the base station 105-*a* may determine that the first RACH message is transmitted as part of a BFR procedure, and the base station 105-*a* may transmit the TAC in the PDCCH of a second RACH message in response to the first RACH message.

Figure 4:
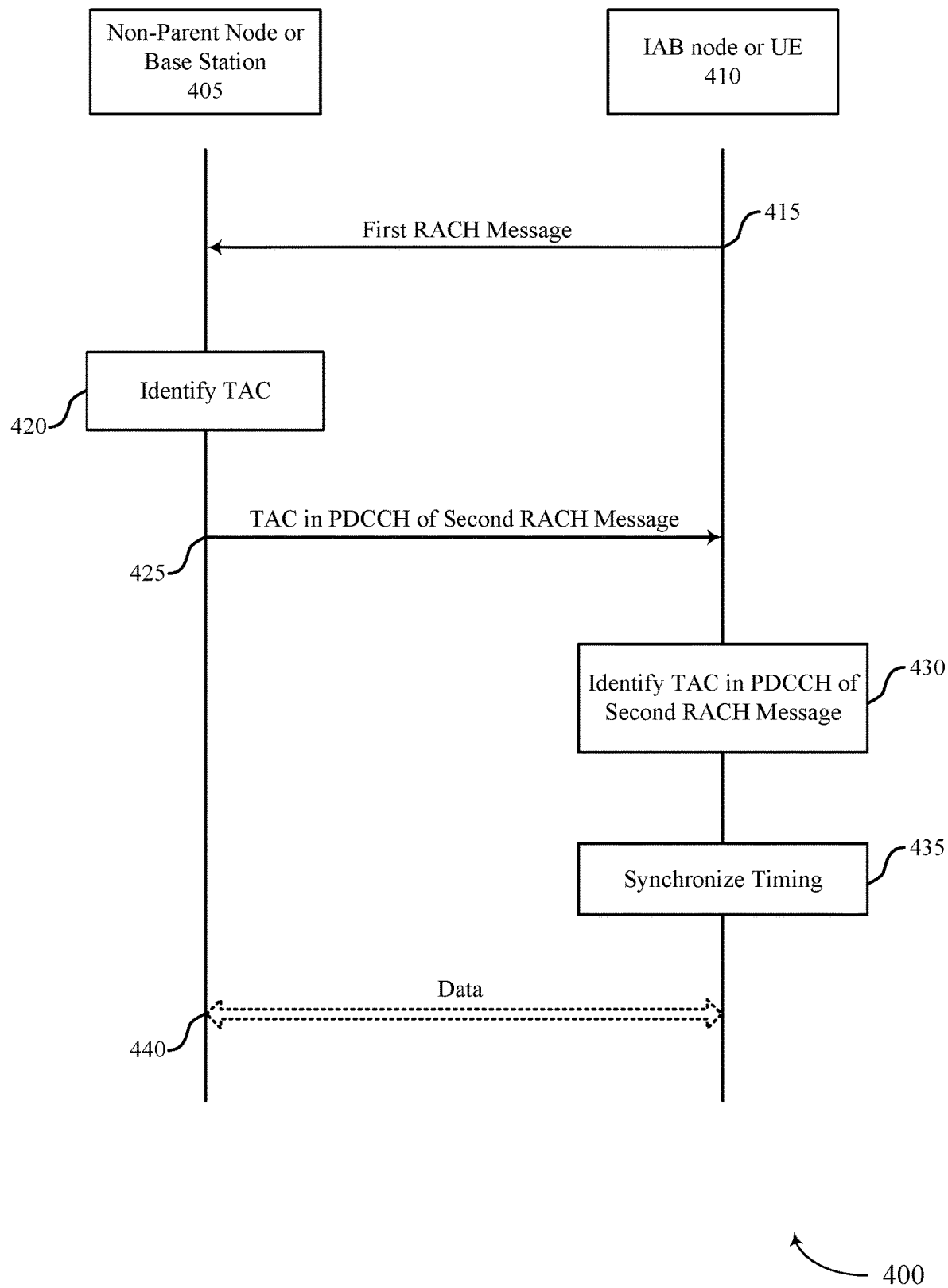
FIG. 4 illustrates an example of a process flow in accordance with aspects of the present disclosure.

FIG. 4 illustrates an example of a process flow 400 in accordance with aspects of the present disclosure. Process flow 400 illustrates aspects of techniques performed by a non-parent node or base station 405, which may be an example of a non-parent node or base station described with reference to FIGS. 1-3. Process flow 400 also illustrates aspects of techniques performed by an IAB node or UE 410, which may be an example of an IAB node or a UE described with reference to FIGS. 1-3. The techniques described herein support efficient TAC signaling in a PDCCH. In some cases, the TAC may be an absolute TAC (e.g., 12 bits) which indicates a timing advance to be applied by an IAB node or UE for communicating in a network. In other cases, the TAC may be a relative TAC (e.g., 6 bits) which indicates an adjustment to a current timing advance (e.g., a timing advance determined based on previous TACs) to be applied by an IAB node or UE for communicating in a network. The network may indicate (e.g., dynamically) whether a TAC is an absolute TAC or a relative TAC. Alternatively, an IAB node or UE may determine whether a TAC is an absolute TAC or a relative TAC based on the number of bits used to transmit the TAC.

At 415, IAB node or UE 410 may transmit a first RACH message to a non-parent node or base station 405 (e.g., as part of a CFRA or CBRA procedure). After receiving the first RACH message, at 420, non-parent node or base station 405 may identify a TAC to transmit based on receiving the first RACH message. At 425, non-parent node or base station 405 may transmit the TAC in a PDCCH of a second RACH message based on the first RACH message. For instance, the non-parent node or base station 405 may determine that the first RACH message is transmitted as a request for the TAC, and the non-parent node or base station 405 may transmit the TAC in the PDCCH of the second RACH message based on the first RACH message being transmitted as a request for the TAC. Alternatively, the non-parent node or base station 405 may determine that the first RACH message is transmitted as part of a BFR procedure, and the non-parent node or base station 405 may transmit the TAC in the PDCCH of the second RACH message based on the first RACH message being transmitted as part of a BFR procedure.

At 430, IAB node or UE 410 may identify the TAC in the PDCCH of the second RACH message based on the first RACH message. For instance, the IAB node or UE 410 may identify the TAC in the PDCCH of the second RACH message based on transmitting the first RACH message as a request for the TAC or as part of a BFR procedure. In some cases, IAB node or UE 410 may receive an indication of dedicated RACH resources allocated for transmitting the first RACH message, and IAB node or UE 410 may transmit the first RACH message on the dedicated RACH resources. In some examples, the second RACH message may be scrambled using an RA-RNTI or a C-RNTI specific to the IAB node or UE 410. At 435, IAB node or UE 410 may synchronize timing or identify time synchronization using the TAC. At 440, IAB node or UE 410 may then communicate with non-parent node or base station 405 or with another node or base station (e.g., a parent node) based on synchronizing timing.

Figure 5:
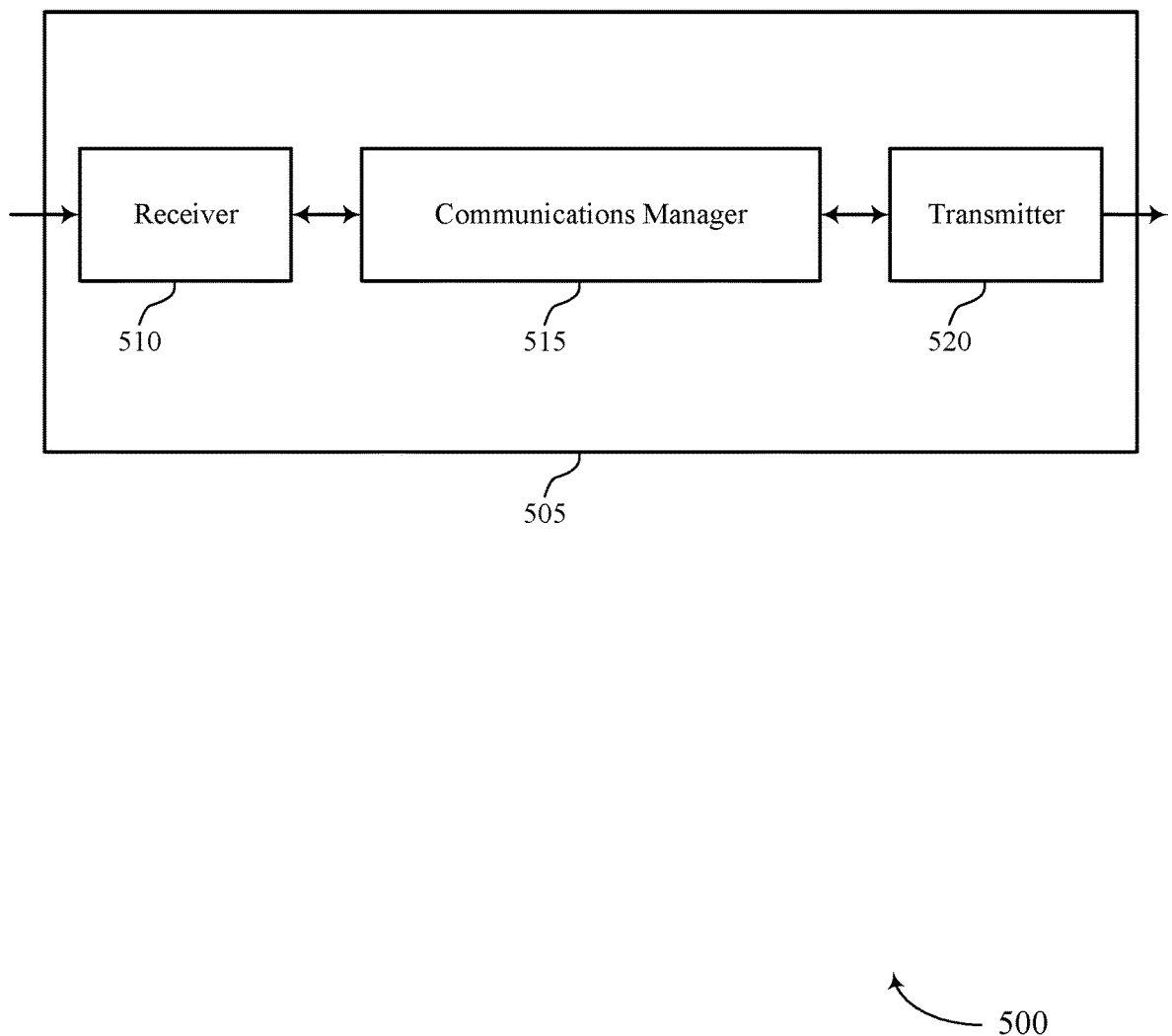
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 or an IAB node as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to timing advance signaling in a PDCCH, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a first random-access channel message, receive a second random-access channel message in response to the first random-access channel message, the second random-access channel message including a timing advance command in a physical downlink control channel, identify the timing advance command in the physical downlink control channel of the second random-access channel message based on the first random-access channel message, and communicate based on identifying the timing advance command. The communications manager 515 may be an example of aspects of the communications manager 810 described herein.

The actions performed by the communications manager 515 as described herein may be implemented to realize one or more potential advantages. One implementation may allow an IAB node or UE to receive a TAC in a PDCCH of a second RACH message and avoid monitoring for a PDSCH in the second RACH message after transmitting a first RACH message (e.g., as a request for the TAC or as part of a BFR procedure). Accordingly, the overhead and latency associated with receiving the TAC may be reduced (e.g., since the IAB node or UE may receive the TAC sooner in the PDCCH and avoid monitoring for data in the PDSCH). In addition, a processor at the IAB node or UE may avoid processing the PDSCH, and processing power may be used more efficiently.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
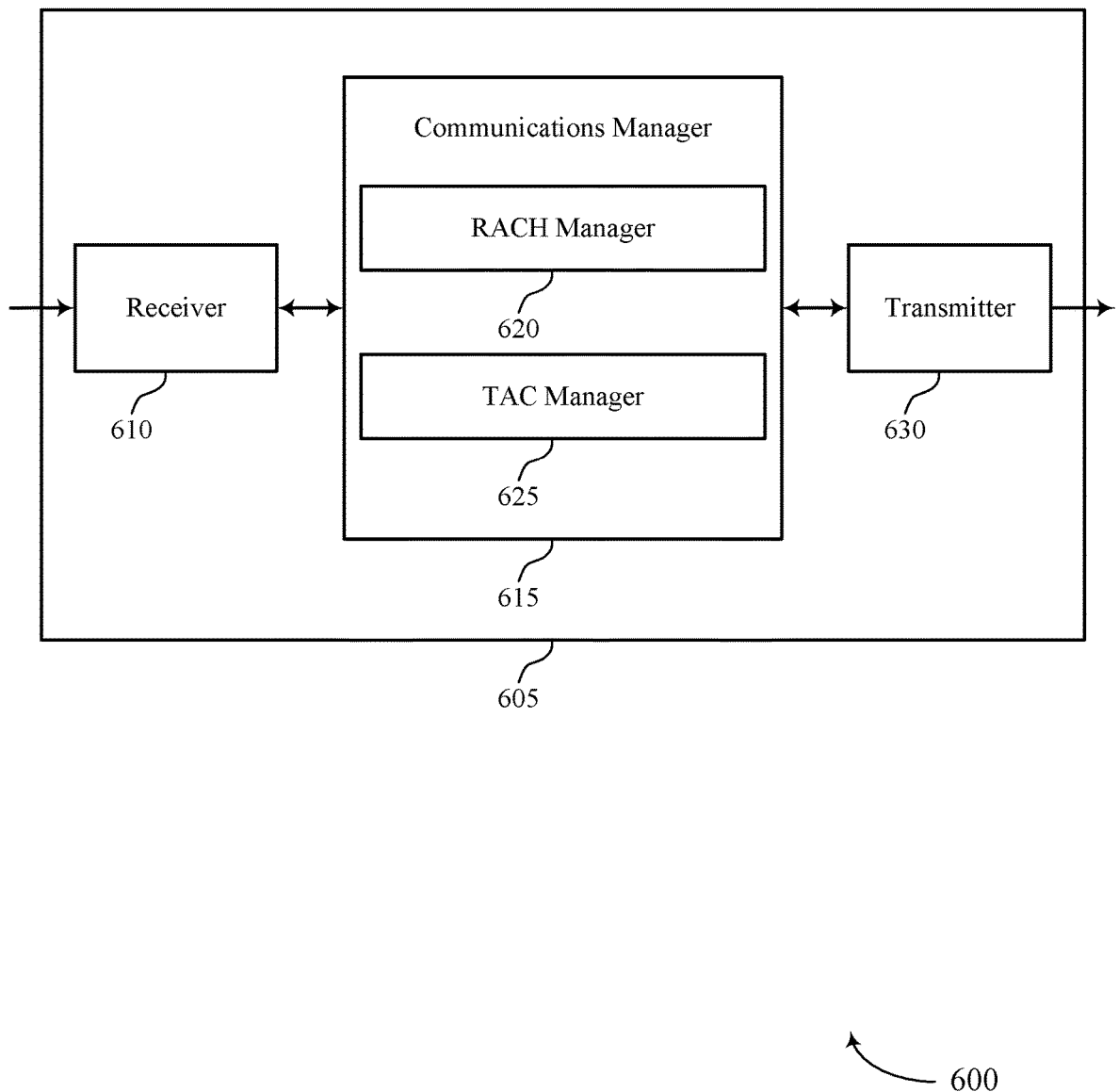

FIG. 6 shows a block diagram 600 of a device 605 in accordance with aspects of the present disclosure. The device 605 may be an example of aspects of a device 505, a UE 115, or an IAB node as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to timing advance signaling in a PDCCH, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a RACH manager 620 and a TAC manager 625. The communications manager 615 may be an example of aspects of the communications manager 810 described herein.

The RACH manager 620 may transmit a first random-access channel message and receive a second random-access channel message in response to the first random-access channel message, the second random-access channel message including a timing advance command in a physical downlink control channel. The TAC manager 625 may identify the timing advance command in the physical downlink control channel of the second random-access channel message based on the first random-access channel message. The communications manager 615 may then communicate based on identifying the timing advance command.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
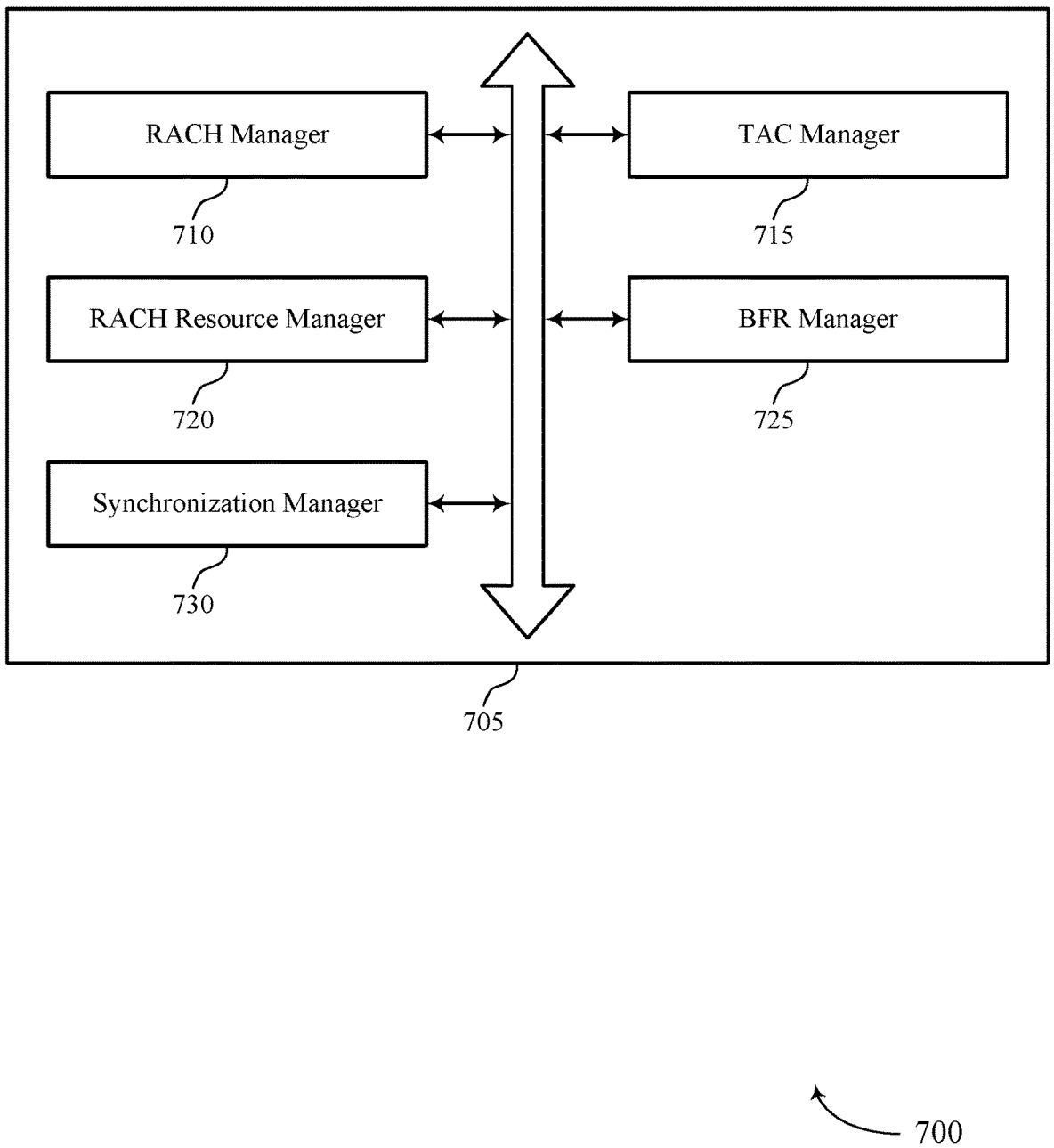
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a RACH manager 710, a TAC manager 715, a RACH resource manager 720, a BFR manager 725, and a synchronization manager 730. Each of these modules may communicate, directly or indirectly, with one another (e.g., via one or more buses).

The RACH manager 710 may transmit a first random-access channel message. In some examples, the RACH manager 710 may receive a second random-access channel message in response to the first random-access channel message, the second random-access channel message including a timing advance command in a physical downlink control channel. In some examples, the RACH manager 710 may transmit, to a neighbor node, the first random-access channel message as a request for the timing advance command. In some examples, the RACH manager 710 may receive, from the neighbor node, the second random-access channel message including the timing advance command in the physical downlink control channel based on the first random-access channel message being transmitted as the request for the timing advance command.

In some examples, the RACH manager 710 may transmit the first random-access channel message to the neighbor node on the dedicated random-access channel resources. In some examples, the RACH manager 710 may receive, from the node, the second random-access channel message including the timing advance command in the physical downlink control channel based on the first random-access channel message being transmitted as part of a BFR procedure. In some cases, the second random-access channel message is scrambled using an RA-RNTI. In some cases, the second random-access channel message is scrambled using a C-RNTI specific to a wireless node (e.g., a UE or IAB node). In some cases, the first random-access channel message is transmitted as part of a CFRA procedure or a CBRA procedure.

The TAC manager 715 may identify the timing advance command in the physical downlink control channel of the second random-access channel message based on the first random-access channel message. In some cases, the timing advance command includes an absolute timing advance command or a relative timing advance command. The RACH resource manager 720 may receive an indication of dedicated random-access channel resources allocated for transmitting the first random-access channel message to the neighbor node. The BFR manager 725 may transmit the first random-access channel message to a node as part of a BFR procedure. The synchronization manager 730 may identify time synchronization using the timing advance command. In some examples, the communications manager 705 may communicate based on identifying the timing advance command. In some examples, the communications manager 705 may communicate based on the time synchronization. In some cases, the communicating is within an IAB network.

Figure 8:
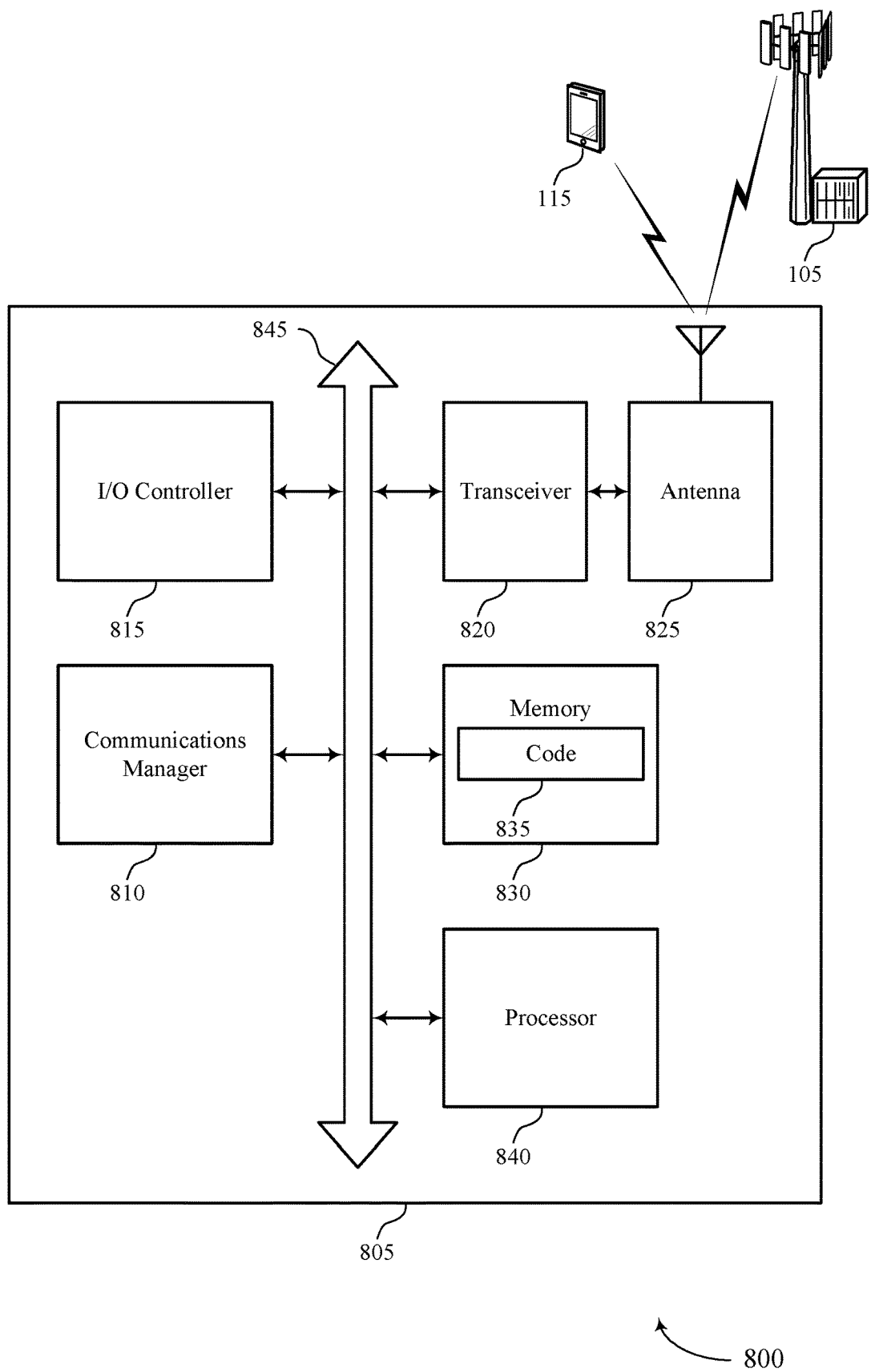
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, a UE 115, or an IAB node as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a first random-access channel message, receive a second random-access channel message in response to the first random-access channel message, the second random-access channel message including a timing advance command in a physical downlink control channel, identify the timing advance command in the physical downlink control channel of the second random-access channel message based on the first random-access channel message, and communicate based on identifying the timing advance command.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting timing advance signaling in a PDCCH).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
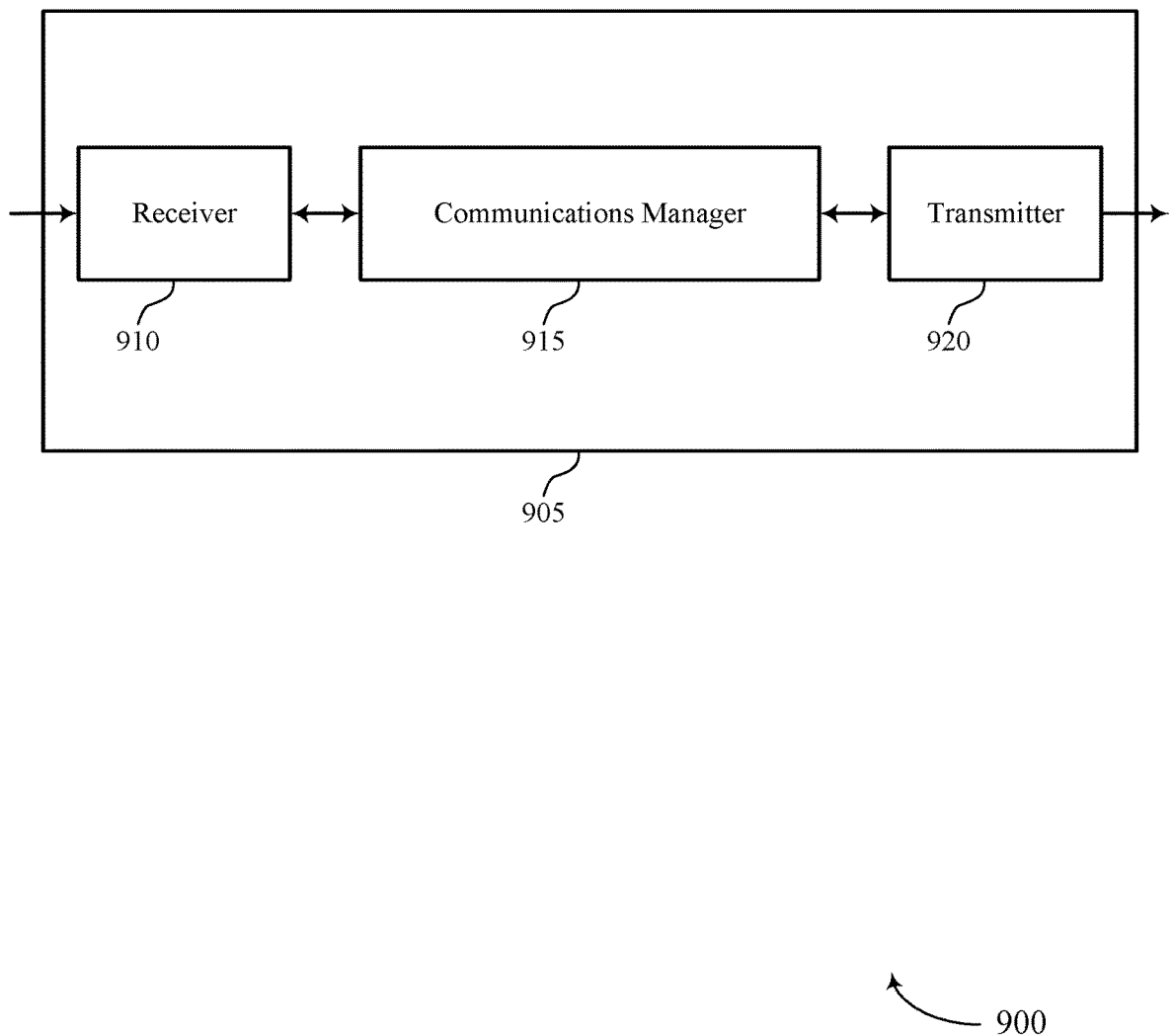
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 or a non-parent IAB node as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to timing advance signaling in a PDCCH, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a first random-access channel message, identify a timing advance command to transmit based on receiving the first random-access channel message, and transmit the timing advance command in a physical downlink control channel of a second random-access channel message based on the first random-access channel message. The communications manager 915 may be an example of aspects of the communications manager 1210 described herein.

The actions performed by the communications manager 915 as described herein may be implemented to realize one or more potential advantages. One implementation may allow a non-parent node or base station to transmit a TAC in a PDCCH of a second RACH message and avoid transmitting a PDSCH in the second RACH message after receiving a first RACH message (e.g., as a request for the TAC or as part of a BFR procedure). Accordingly, the overhead and latency associated with transmitting the TAC may be reduced (e.g., since the non-parent node or base station may transmit the TAC sooner in the PDCCH and avoid transmitting data in the PDSCH). In addition, a processor at the non-parent node or base station may avoid processing the PDSCH for transmission, and processing power may be used more efficiently.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
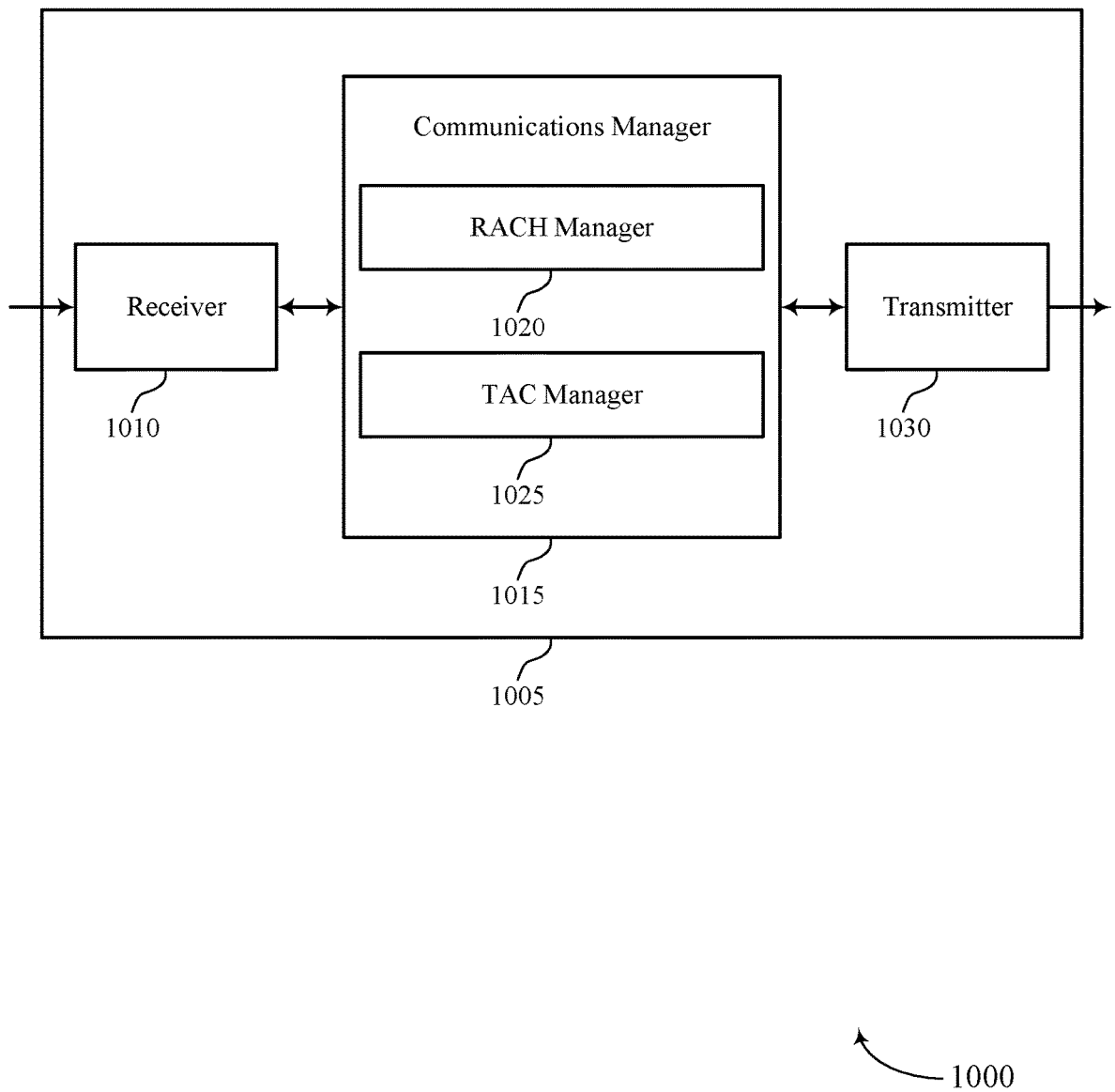

FIG. 10 shows a block diagram 1000 of a device 1005 in accordance with aspects of the present disclosure. The device 1005 may be an example of aspects of a device 905, a base station 105, or a non-parent IAB node as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to timing advance signaling in a PDCCH, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a RACH manager 1020 and a TAC manager 1025. The communications manager 1015 may be an example of aspects of the communications manager 1210 described herein.

The RACH manager 1020 may receive a first random-access channel message. The TAC manager 1025 may identify a timing advance command to transmit based on receiving the first random-access channel message. The RACH manager 1020 may then transmit the timing advance command in a physical downlink control channel of a second random-access channel message based on the first random-access channel message.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
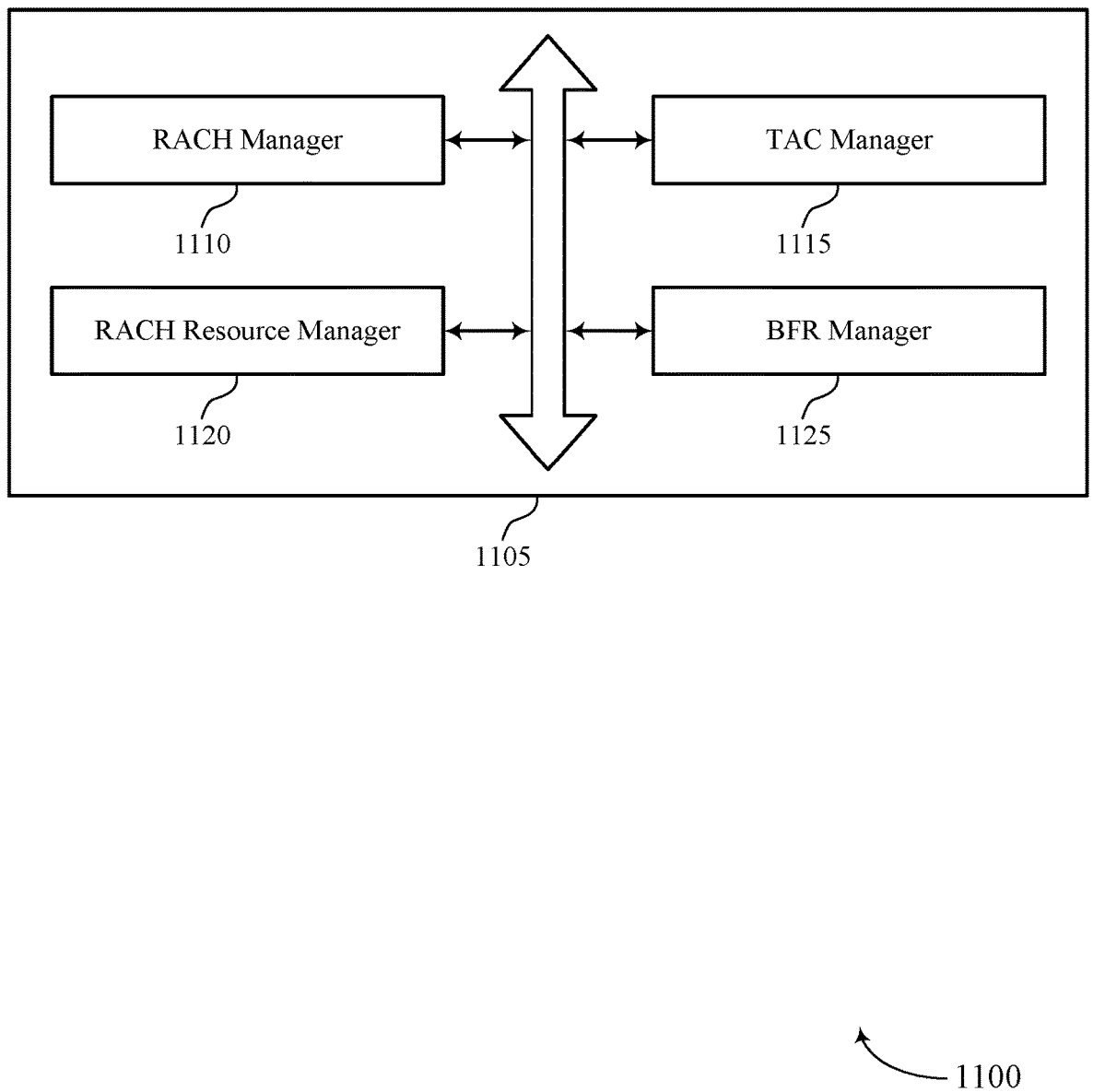
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a RACH manager 1110, a TAC manager 1115, a RACH resource manager 1120, and a BFR manager 1125. Each of these modules may communicate, directly or indirectly, with one another (e.g., via one or more buses).

The RACH manager 1110 may receive a first random-access channel message. In some examples, the RACH manager 1110 may transmit the timing advance command in a physical downlink control channel of a second random-access channel message based on the first random-access channel message. In some examples, the RACH manager 1110 may determine that the first random-access channel message is transmitted as a request for the timing advance command. In some examples, the RACH manager 1110 may transmit the timing advance command in the physical downlink control channel of the second random-access channel message based on the first random-access channel message being transmitted as the request for the timing advance command.

In some examples, the RACH manager 1110 may receive the first random-access channel message on the dedicated random-access channel resources. In some examples, the RACH manager 1110 may transmit, to the UE, the timing advance command in the physical downlink control channel of the second random-access channel message based on the first random-access channel message being received as part of a BFR procedure. In some cases, the second random-access channel message is scrambled using an RA-RNTI. In some cases, the second random-access channel message is scrambled using a C-RNTI specific to a UE. In some cases, the first random-access channel message is received as part of a CFRA procedure or a CBRA procedure.

The TAC manager 1115 may identify a timing advance command to transmit based on receiving the first random-access channel message. In some cases, the timing advance command includes an absolute timing advance command or a relative timing advance command. The RACH resource manager 1120 may transmit an indication of dedicated random-access channel resources allocated for transmitting the first random-access channel message. The BFR manager 1125 may receive the first random-access channel message from a UE as part of a BFR procedure.

Figure 12:
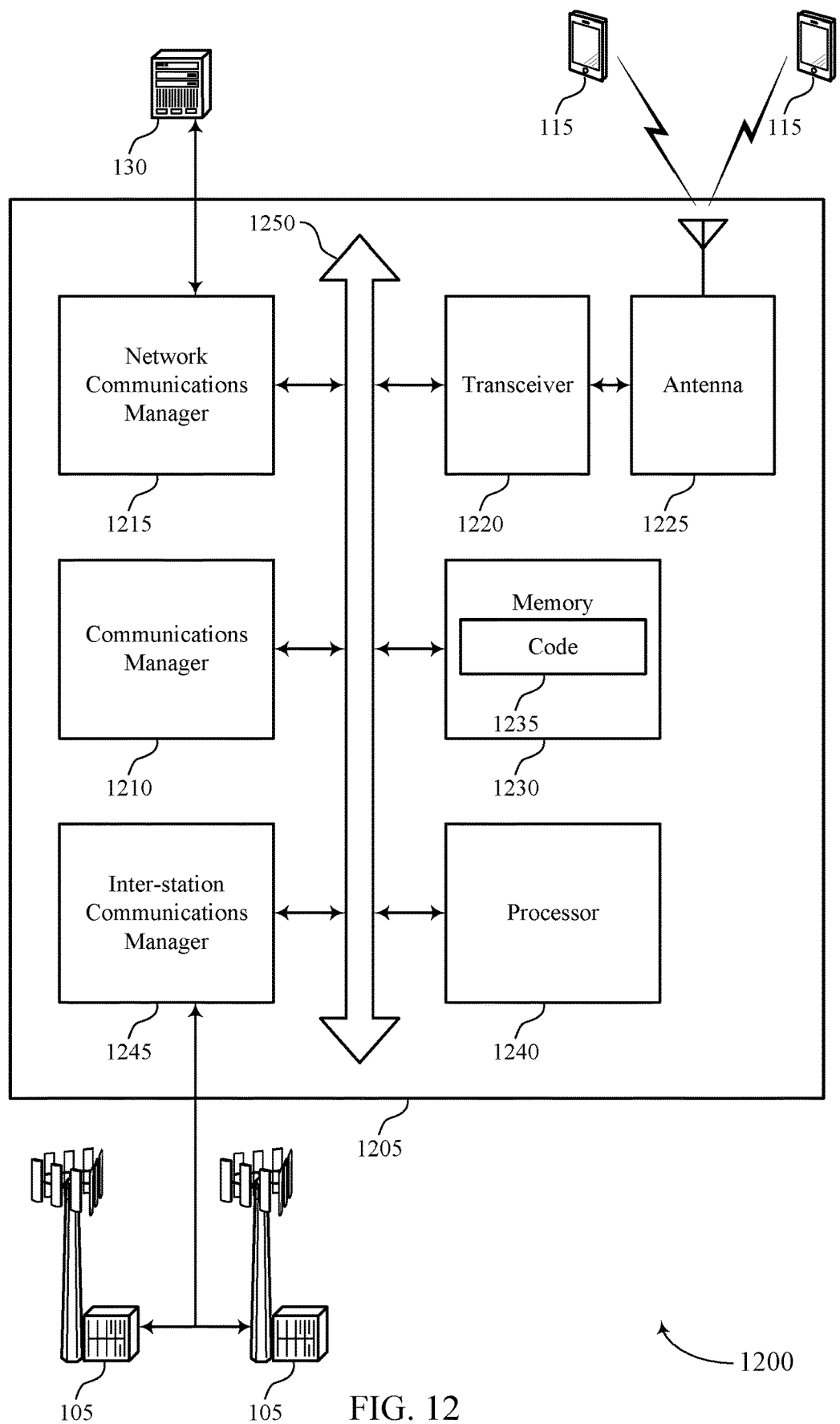
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, a base station 105, or a non-parent IAB node as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a first random-access channel message, identify a timing advance command to transmit based on receiving the first random-access channel message, and transmit the timing advance command in a physical downlink control channel of a second random-access channel message based on the first random-access channel message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting timing advance signaling in a PDCCH).

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
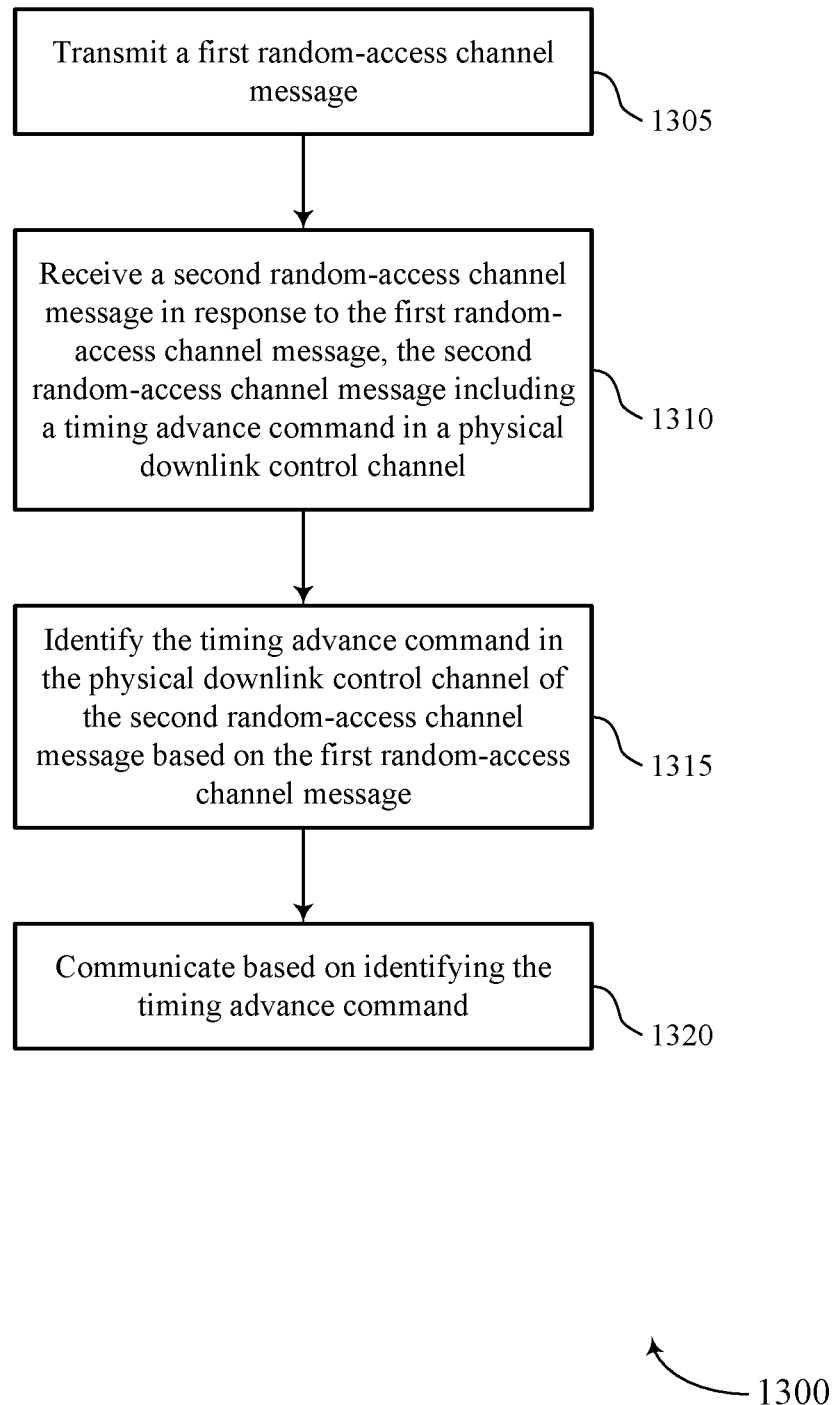
FIGS. 13 and 14 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may transmit a first random-access channel message. The operations of 1305 may be performed according to the methods described herein. In some examples, aspects of the operations of 1305 may be performed by a RACH manager as described with reference to FIGS. 5 through 8.

At 1310, the UE may receive a second random-access channel message in response to the first random-access channel message, the second random-access channel message including a timing advance command in a physical downlink control channel. The operations of 1310 may be performed according to the methods described herein. In some examples, aspects of the operations of 1310 may be performed by a RACH manager as described with reference to FIGS. 5 through 8.

At 1315, the UE may identify the timing advance command in the physical downlink control channel of the second random-access channel message based on the first random-access channel message. The operations of 1315 may be performed according to the methods described herein. In some examples, aspects of the operations of 1315 may be performed by a TAC manager as described with reference to FIGS. 5 through 8.

At 1320, the UE may communicate based on identifying the timing advance command. The operations of 1320 may be performed according to the methods described herein. In some examples, aspects of the operations of 1320 may be performed by a TAC manager as described with reference to FIGS. 5 through 8.

Figure 14:
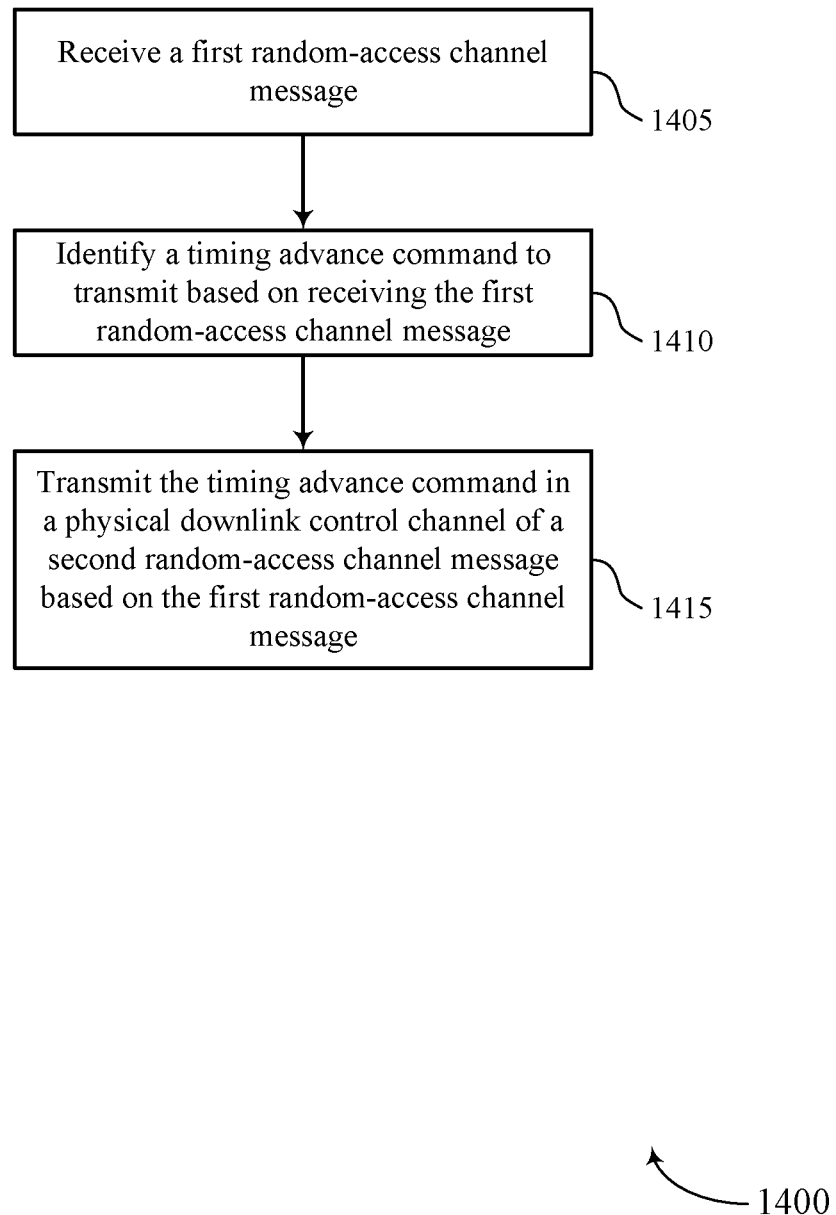

FIG. 14 shows a flowchart illustrating a method 1400 in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1405, the base station may receive a first random-access channel message. The operations of 1405 may be performed according to the methods described herein. In some examples, aspects of the operations of 1405 may be performed by a RACH manager as described with reference to FIGS. 9 through 12.

At 1410, the base station may identify a timing advance command to transmit based on receiving the first random-access channel message. The operations of 1410 may be performed according to the methods described herein. In some examples, aspects of the operations of 1410 may be performed by a TAC manager as described with reference to FIGS. 9 through 12.

At 1415, the base station may transmit the timing advance command in a physical downlink control channel of a second random-access channel message based on the first random-access channel message. The operations of 1415 may be performed according to the methods described herein. In some examples, aspects of the operations of 1415 may be performed by a RACH manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856

(TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   determining to synchronize timing with a network via a random access procedure;
   transmitting a first random-access channel message associated with the random access procedure;
   receiving, via a physical downlink control channel, a second random-access channel message associated with the random access procedure in response to the first random-access channel message, the second random-access channel message received via the physical downlink control channel comprising a timing advance command;
   identifying the timing advance command in the second random-access channel message received via the physical downlink control channel based at least in part on the first random-access channel message; and
   communicating based at least in part on identifying the timing advance command.

2. The method of claim 1, wherein transmitting the first random-access channel message and receiving the second random-access channel message comprises:
   transmitting, to a neighbor node, the first random-access channel message as a request for the timing advance command; and
   receiving, from the neighbor node via the physical downlink control channel, the second random-access channel message, the second random-access channel message received via the physical downlink control channel comprising the timing advance command based at least in part on the first random-access channel message being transmitted as the request for the timing advance command.

3. The method of claim 2, further comprising:
   receiving an indication of dedicated random-access channel resources allocated for transmitting the first random-access channel message to the neighbor node; and
   transmitting the first random-access channel message to the neighbor node on the dedicated random-access channel resources.

4. The method of claim 3, wherein the second random-access channel message is scrambled using a random-access radio network temporary identifier (RA-RNTI).

5. The method of claim 2, wherein the second random-access channel message is scrambled using a cell radio network temporary identifier (C-RNTI) specific to a wireless node.

6. The method of claim 2, wherein the communicating is within an integrated access backhaul (IAB) network.

7. The method of claim 1, wherein transmitting the first random-access channel message and receiving the second random-access channel message comprises:
   transmitting the first random-access channel message to a node as part of a beam failure recovery (BFR) procedure; and
   receiving, from the node via the physical downlink control channel, the second random-access channel message, the second random-access channel message received via the physical downlink control channel comprising the timing advance command based at least in part on the first random-access channel message being transmitted as part of a BFR procedure.

8. The method of claim 1, wherein communicating based at least in part on identifying the timing advance command comprises:
   identifying time synchronization using the timing advance command; and
   communicating based at least in part on the time synchronization.

9. The method of claim 1, wherein the first random-access channel message is transmitted as part of a contention-free random-access (CFRA) procedure or a contention-based random-access (CBRA) procedure.

10. The method of claim 1, wherein the timing advance command comprises an absolute timing advance command or a relative timing advance command.

11. A method for wireless communication, comprising:
    receiving a first random-access channel message associated with a determined random access procedure to synchronize timing;
    identifying a timing advance command to transmit based at least in part on receiving the first random-access channel message;
    transmitting the timing advance command in a second random-access channel message associated with the random access procedure via a physical downlink control channel based at least in part on the first random-access channel message; and
    communicating based at least in part on the identified timing advance command.

12. The method of claim 11, further comprising:
    determining that the first random-access channel message is transmitted as a request for the timing advance command; and
    transmitting the timing advance command in the second random-access channel message via the physical downlink control channel based at least in part on the first random-access channel message being transmitted as the request for the timing advance command.

13. The method of claim 12, further comprising:
transmitting an indication of dedicated random-access channel resources allocated for transmitting the first random-access channel message; and
receiving the first random-access channel message on the dedicated random-access channel resources.

14. The method of claim 13, wherein the second random-access channel message is scrambled using a random-access radio network temporary identifier (RA-RNTI).

15. The method of claim 12, wherein the second random-access channel message is scrambled using a cell radio network temporary identifier (C-RNTI) specific to a user equipment (UE).

16. The method of claim 11, further comprising:
receiving the first random-access channel message from a user equipment (UE) as part of a beam failure recovery (BFR) procedure; and
transmitting, to the UE, the timing advance command in the second random-access channel message via the physical downlink control channel based at least in part on the first random-access channel message being received as part of a BFR procedure.

17. The method of claim 11, wherein the first random-access channel message is received as part of a contention-free random-access (CFRA) procedure or a contention-based random-access (CBRA) procedure.

18. The method of claim 11, wherein the timing advance command comprises an absolute timing advance command or a relative timing advance command.

19. An apparatus for wireless communication, comprising: a processor, memory in electronic communication with the processor; and instructions stored in the memory and executable by the processor to cause the apparatus to:
determine to synchronize timing with a network via a random access procedure;
transmit a first random-access channel message associated with the random access procedure;
receive, via a physical downlink control channel, a second random-access channel message associated with the random access procedure in response to the first random-access channel message, the second random-access channel message received via the physical downlink control channel comprising a timing advance command;
identify the timing advance command in the second random-access channel message received via the physical downlink control channel based at least in part on the first random-access channel message; and
communicate based at least in part on identifying the timing advance command.

20. The apparatus of claim 19, wherein the instructions to transmit the first random-access channel message and receiving the second random-access channel message are executable by the processor to cause the apparatus to:
transmit, to a neighbor node, the first random-access channel message as a request for the timing advance command; and
receive, from the neighbor node via the physical downlink control channel, the second random-access channel message, the second random-access channel message received via the physical downlink control channel comprising the timing advance command based at least in part on the first random-access channel message being transmitted as the request for the timing advance command.

21. The apparatus of claim 20, wherein the instructions are further executable by the processor to cause the apparatus to:
receive an indication of dedicated random-access channel resources allocated for transmitting the first random-access channel message to the neighbor node; and
transmit the first random-access channel message to the neighbor node on the dedicated random-access channel resources.

22. The apparatus of claim 21, wherein the second random-access channel message is scrambled using a random-access radio network temporary identifier (RA-RNTI).

23. The apparatus of claim 20, wherein the second random-access channel message is scrambled using a cell radio network temporary identifier (C-RNTI) specific to a wireless node.

24. The apparatus of claim 20, wherein the communicating is within an integrated access backhaul (IAB) network.

25. The apparatus of claim 19, wherein the instructions to transmit the first random-access channel message and receiving the second random-access channel message are executable by the processor to cause the apparatus to:
transmit the first random-access channel message to a node as part of a beam failure recovery (BFR) procedure; and
receive, from the node, the second random-access channel message, the second random-access channel message received via the physical downlink control channel comprising the timing advance command based at least in part on the first random-access channel message being transmitted as part of a BFR procedure.

26. The apparatus of claim 19, wherein the instructions to communicate based at least in part on identifying the timing advance command are executable by the processor to cause the apparatus to:
identify time synchronization using the timing advance command; and
communicate based at least in part on the time synchronization.

27. The apparatus of claim 19, wherein the first random-access channel message is transmitted as part of a contention-free random-access (CFRA) procedure or a contention-based random-access (CBRA) procedure.

28. The apparatus of claim 19, wherein the timing advance command comprises an absolute timing advance command or a relative timing advance command.

29. An apparatus for wireless communication, comprising: a processor, memory in electronic communication with the processor; and instructions stored in the memory and executable by the processor to cause the apparatus to:
receive a first random-access channel message associated with a determined random access procedure to synchronize timing;
identify a timing advance command to transmit based at least in part on receiving the first random-access channel message;
transmit the timing advance command in a second random-access channel message associated with the random access procedure via a physical downlink control channel based at least in part on the first random-access channel message; and
communicating based at least in part on the identified timing advance command.

30. The apparatus of claim 29, wherein the instructions are further executable by the processor to cause the apparatus to:

determine that the first random-access channel message is transmitted as a request for the timing advance command; and transmit the timing advance command in the second random-access channel message via the physical downlink control channel based at least in part on the first random-access channel message being transmitted as the request for the timing advance command.

\* \* \* \* \*